United States Patent
Stansfield (10) Patent No.: US 10,072,908 B2
(45) Date of Patent: Sep. 11, 2018

(54) MISSILE SEEKER AND GUIDANCE METHOD

(71) Applicant: MBDA UK LIMITED, Stevenage, Hertfordshire (GB)

(72) Inventor: Nigel Stansfield, Stevenage (GB)

(73) Assignee: MBDA UK LIMITED, Stevenage, Hertfordshire (GB)

( * ) Notice: Subject to any disclaimer, the term of this patent is extended or adjusted under 35 U.S.C. 154(b) by 71 days.

(21) Appl. No.: 14/760,546

(22) PCT Filed: Jan. 10, 2014

(86) PCT No.: PCT/GB2014/050062
§ 371 (c)(1),
(2) Date: Jul. 13, 2015

(87) PCT Pub. No.: WO2014/111691
PCT Pub. Date: Jul. 24, 2014

(65) Prior Publication Data
US 2016/0003579 A1    Jan. 7, 2016

(30) Foreign Application Priority Data
Jan. 15, 2013 (GB) .................................. 1300848.7

(51) Int. Cl.
*F41G 7/28* (2006.01)
*F41G 7/22* (2006.01)
(Continued)

(52) U.S. Cl.
CPC ............. *F41G 7/28* (2013.01); *F41G 7/2246* (2013.01); *F41G 7/2293* (2013.01);
(Continued)

(58) Field of Classification Search
CPC . F41G 7/20; F41G 7/22; F41G 7/2246; F41G 7/2273; F41G 7/2286;
(Continued)

(56) References Cited

U.S. PATENT DOCUMENTS

| | | | | |
|---|---|---|---|---|
| 3,737,120 A | * | 6/1973 | Green | F41G 7/2246 244/3.17 |
| 5,597,136 A | | 1/1997 | Wilke | |
| 5,626,311 A | * | 5/1997 | Smith | F41G 7/2293 244/3.16 |

(Continued)

FOREIGN PATENT DOCUMENTS

| | | | | |
|---|---|---|---|---|
| EP | 0508905 A1 | * | 10/1992 | ........... F41G 7/2293 |
| EP | 1995561 A1 | | 11/2008 | |

(Continued)

OTHER PUBLICATIONS

International Search Report and Written Opinion dated Jul. 30, 2015 issued in PCT/GB2014/050062.
(Continued)

*Primary Examiner* — Bernarr E Gregory
(74) *Attorney, Agent, or Firm* — Scully, Scott, Murphy & Presser, P.C.

(57) ABSTRACT

In a method of guiding a missile in flight to a target (FIG. 1), the location of the missile and the range to the target are measured at a plurality of moments during the flight of the missile (step 10). The location of the target is calculated from the measured ranges and the measured missile locations (step 20). A required velocity vector angle is calculated from the calculated location of the target and a guidance law (step 30). A lateral acceleration required to provide the missile with a velocity oriented to the target at the required velocity vector angle is calculated for the missile (step 40). The missile is caused to accelerate with the calculated lateral acceleration, so that the missile to follows a trajectory according to the guidance law (step 50).

17 Claims, 2 Drawing Sheets

(51) Int. Cl.
*G01S 7/40* (2006.01)
*G01S 13/87* (2006.01)
*G01S 13/88* (2006.01)
*G01S 13/90* (2006.01)
*G01S 13/06* (2006.01)
*G01S 13/00* (2006.01)

(52) U.S. Cl.
CPC ............ *G01S 7/4004* (2013.01); *G01S 13/06* (2013.01); *G01S 13/878* (2013.01); *G01S 13/883* (2013.01); *G01S 13/9035* (2013.01)

(58) Field of Classification Search
CPC . F41G 7/2293; F41G 7/24; F41G 7/28; G01S 7/02; G01S 7/40; G01S 7/4004; G01S 13/02; G01S 13/06; G01S 13/87; G01S 13/878; G01S 13/88; G01S 13/883; G01S 13/89; G01S 13/90; G01S 13/9035
See application file for complete search history.

(56) References Cited

U.S. PATENT DOCUMENTS

2009/0173820 A1* 7/2009 Bock .................. F41G 7/22
244/3.15

FOREIGN PATENT DOCUMENTS

| FR | 2879753 A1 | 6/2006 | |
|---|---|---|---|
| GB | 2242589 A | 10/1991 | |
| GB | 2489829 A * | 10/2012 | ........... F41G 7/2293 |
| WO | WO 2006/110310 A1 | 10/2006 | |

OTHER PUBLICATIONS

International Search Report and Written Opinion dated Apr. 22, 2014 issued in PCT/GB2014/050062.
GB Search Report dated Jul. 12, 2013 issued in GB 1300848.7.

* cited by examiner

MISSILE SEEKER AND GUIDANCE METHOD

FIELD OF THE INVENTION

This invention relates to the field of missile seekers and guidance methods.

BACKGROUND ART

Guided missiles that are capable of automatic tracking of their target are typically equipped with a seeker, which includes a sensor and an error-measuring device that indicates a tracking error (i.e. the co-ordinates of the target in the co-ordinate frame of the seeker, the target being at the origin of that frame when the target is dead ahead of the missile). The seeker receives electromagnetic radiation that is reflected or otherwise emanates from the target, and a guidance law is used to calculate a control signal that must be applied to the missile's steering mechanisms in order for the missile to intercept the target.

There is a need for a new generation of very small anti-surface missiles that can acquire and track military targets such as vehicles and defence installations. Because of size and cost constraints, current missiles of that kind generally either use command guidance (i.e. there is no seeker inside the missile) or a very simple seeker such as a semi-active laser receiver. There is a need for simpler, lower-cost seeker concepts to meet the needs of future lightweight weapons. Passive infrared- or visible-band seekers can provide autonomous operation, so that the operator does not need to keep a line of sight to the target, but they suffer from the disadvantage that their performance is degraded when visibility is poor, e.g. due to fog, rain or battlefield smoke. Radar seekers do not suffer from that disadvantage, but prior-art radar seekers are typically large, costly and provide insufficient resolution to provide reliable acquisition of the correct target.

A seeker typically measures the position of a target by determining the angle of arrival of the electromagnetic radiation arriving at the seeker from the target. The determination of that angle can be achieved in a number of different ways. In conical scanning (conscan) radar, a narrow radar beam is rotated around the radar boresight, typically by mechanical means. The measured amplitude of the signals received at the radar from the target will vary with the angle between the boresight and the line of sight of the target; when the boresight is on the target, the measured amplitude will be constant as the beam rotates. In a monopulse radar, a plurality of (typically four) receiving antennas are arranged adjacent to each other, equally spaced around a central point. A radar pulse echo from a target directly on the boresight falls equally on all of the antennas, whereas a pulse echo from a target angularly displaced from the boresight falls more on some of the antennas than on others. The relative signal amplitudes received from each antenna therefore vary according to the position of the target. A comparator and signal processor is used to derive the angle of arrival of the target signal. A monopulse radar requires a multi-channel radar receiver, which can be large and expensive. Also, it can be difficult and expensive to achieve good accuracy with a monopulse radar: angle measurements are corrupted by thermal noise at low signal-to-noise ratios and high tolerances are required in the gimbal mechanism, the servo pickoffs and gyros, the antenna and the radome aberration, all of which tends to drive up the cost and complexity of the seeker.

Cost savings could be achieved by eliminating the need for a gimbal mechanism to steer the antenna. Phased-array antennas, in which steering is achieved by altering the relative phases of an array of antenna elements, do not require a gimbal mechanism. However, in the field of guided missiles, phased-array antennas suffer from a number of significant disadvantages. In particular, their available aperture is small, which makes it difficult to achieve sufficient precision in steering for reliable target tracking accuracy.

It would be advantageous to provide a missile seeker and guidance method in which one or more of the aforementioned disadvantages is eliminated or at least reduced.

DISCLOSURE OF THE INVENTION

A first aspect of the invention provides a method for a seeker, in a missile in flight, to locate a target, the method having the steps set out in claim 1 below.

It will be understood that the range to the target is the distance to the target, whereas the location of the target is determined by the range and the angular position of the target relative to the missile.

The invention enables a method of tracking that can be carried out by a radar seeker that is considerably simpler than conventional seekers. The concept is based on the fact that a radar can measure range (and also closing velocity) with considerable precision. The seeker can calculate the location of the target and create guidance commands without a requirement for an angle-tracking loop or a steerable monopulse antenna (although use of the same is not excluded from the present invention). Thus, the position of the target can be derived purely by measuring the range history (and, in some embodiments, range rate and acceleration) while the missile flies an appropriate trajectory.

It may be that the location of the missile is measured by a navigation system comprised in the missile, for example a Global Positioning System (GPS) receiver. It may be that the measurement of the location of the missile is made relative to Earth axes. It may be that the missile includes an inertial system to measure accelerations of the missile.

It may be that the measurements of missile location and target range are made at successive points through the missile trajectory.

It may be that the measurement of the location of the missile and/or the measurement of the range to the target are made at sufficiently many moments during the flight of the missile to ensure that noise in the measurement is reduced to a level at which it does not significantly affect the accuracy of the calculation of the location of the target.

The method may also include the step of measuring, at a plurality of moments during the flight of the missile, the velocity of the missile. The measurement of the velocity of the missile may be made by measuring changes in the location of the missile over a period of time. The method may also include the step of measuring, at a plurality of moments during the flight of the missile, the acceleration of the missile. The measurement may be made by measuring changes in the location and/or velocity of the missile over a period of time.

The method may include the step of improving the accuracy of the calculation of target location by using Doppler information. Use of Doppler information enables the target to be separated from nearby interfering clutter, which improves the accuracy of the calculation of target location.

It may be that the calculation of the location of the target includes the step of extrapolating forward an intermediate calculated location, to take into account the finite time taken to perform the measurements and calculations.

It may be that steps (a) and (b) of the method are repeated continuously during the flight of the missile, to produce an updating measurement of the target location.

It may be that an iterative algorithm is used to find values that minimise an error function for unknown parameters of the target, for example target initial position and velocity. The error function may comprise a sum of error terms, each corresponding to an unknown parameter, that are each weighted by the value of the contribution of that error to the error in calculation of the target location.

It may be that a progressive time shift and frequency shift are applied to a signal returned from the target, so that the target can be treated as if it remains at a stationary range and Doppler.

In the case of tracking a single target, it may be that samples from a signal returned from the target are processed a plurality of times in parallel, each with a different Doppler walk associated with a different rate of change of Doppler shift, resulting in a multiple set of multiple-range Doppler maps. It may be that the apparent contrast of the maps is measured. It may be that the relative acceleration of the missile with respect to the target is deduced by identifying the Doppler rate corresponding to the maximum contrast amongst the measured contrasts.

It may be that the method is used to provide in-flight calibration of a monopulse radar antenna system.

It may be that the target is a slowly accelerating target such as a ground- or sea-based target or a hovering helicopter.

A second aspect of the invention provides a radar seeker configured to locate a target by:
(a) measuring, at a plurality of moments during the flight of the missile, the location of the missile and the range from the missile to the target; and
(b) calculating the location of the target from the measured ranges and the measured missile locations.

Advantageously, the radar seeker is configured to utilise a waveform having a bandwidth sufficient to permit resolution of the target from other targets and clutter in the vicinity of the target.

It may be that the seeker includes an antenna. It may be that the seeker is capable of synthetic aperture radar (SAR) processing.

It may be that the seeker does not include a multi-channel radar receiver.

It may be that the seeker does not include a steerable antenna.

Alternatively, it may be that the seeker includes a beam-steering system. For example, the seeker may include a switchable antenna, which can be switched between a small number of preset angles, selected according to the angle to the target.

It may be that seeker emits radar signals having a bandwidth sufficient to provide resolution of a magnitude less than the size of the target. That may for example be a bandwidth of 500 MHz. Resolution r is related the waveform bandwidth B (Hz) by the equation:

$$r = \frac{c}{2B}$$

where c is the velocity of light

It may be that the radar uses binary phase coding, which may have a rate of up to the bandwidth of the waveform, i.e. B Hz.

It may be that the antenna has a maximum field of regard sufficient to encompass all target sightline angles encountered during missile flight. That may for example be a maximum field of regard of at least ±25°. It may be that the seeker includes a fixed, un-steerable, antenna. It may be that the antenna is a conformal array. The missile may then be configured to allow space at the front of the seeker for a warhead. It may be that a further seeker, operating in the infrared or visible electromagnetic spectrum, may be positioned within the conformal radar antenna.

It may be that the seeker includes an autofocus system configured to correct for motion of the target relative to the seeker during the radar integration period, the autofocus system being configured to provide data from which the relative acceleration of the missile with respect to the target is calculated. Thus calculation of the missile/target sightline acceleration may be used to improve the calculation of the target location.

A third aspect of the invention provides a missile having the features set out in claim 10 below.

It may be that the guidance law causes the missile to fly on a curved trajectory. It may be that the curved trajectory consists principally of two stages. It may be that, in the first stage, the missile trajectory is an equiangular spiral around the target. It may be that, on the equiangular trajectory, the angle between the longitudinal axis of the missile and the calculated target location is kept at a maximum, i.e. it is as large as is possible whilst still keeping the target visible to the seeker of the missile. It may be that, when the lateral acceleration required to maintain the missile on that equiangular spiral trajectory becomes too large, a second stage begins. It may be that, in the second stage, the missile has a trajectory with a constant lateral acceleration equal to the maximum lateral acceleration of which the missile is capable. Such a trajectory is approximately circular if the missile velocity is constant.

It may be that the trajectory is at a small angle to the horizontal throughout substantial the whole of the trajectory. It may be that the trajectory is at a small angle to the horizontal throughout substantial the whole of the trajectory, except during a terminal phase during which the missile trajectory is close to vertical.

It may be that the missile is a small missile, for example being too small in diameter to accommodate a seeker with a gimballed antenna with sufficiently small beamwidth to provide adequate angular resolution of the target. For example, it may be that the diameter is less than 100 mm for a seeker operating in W band (approximately 100 GHz).

Other optional but preferred features of the invention are set out in the dependent claims.

It will of course be appreciated that features described in relation to one aspect of the present invention may be incorporated into other aspects of the present invention. For example, the seeker of the invention may incorporate any of the features described with reference to the method of the invention and vice versa.

BRIEF DESCRIPTION OF THE DRAWINGS

Example embodiments of the invention will now be described by way of example only and with reference to the accompanying drawings, of which.

DETAILED DESCRIPTION

In a seeker and guidance system (FIG. 1), an antenna 1 is connected to a seeker transmitter and receiver via a duplexer 2. The duplexer is a Transmit-Receive (TR) switch (or, in other example embodiments, a circulator) configured to connect the antenna 1 to a receiver mixer 6 during a receive phase and to connect the antenna 1 to a transmitter phase shifter 3 during a transmit phase.

Figure 1:
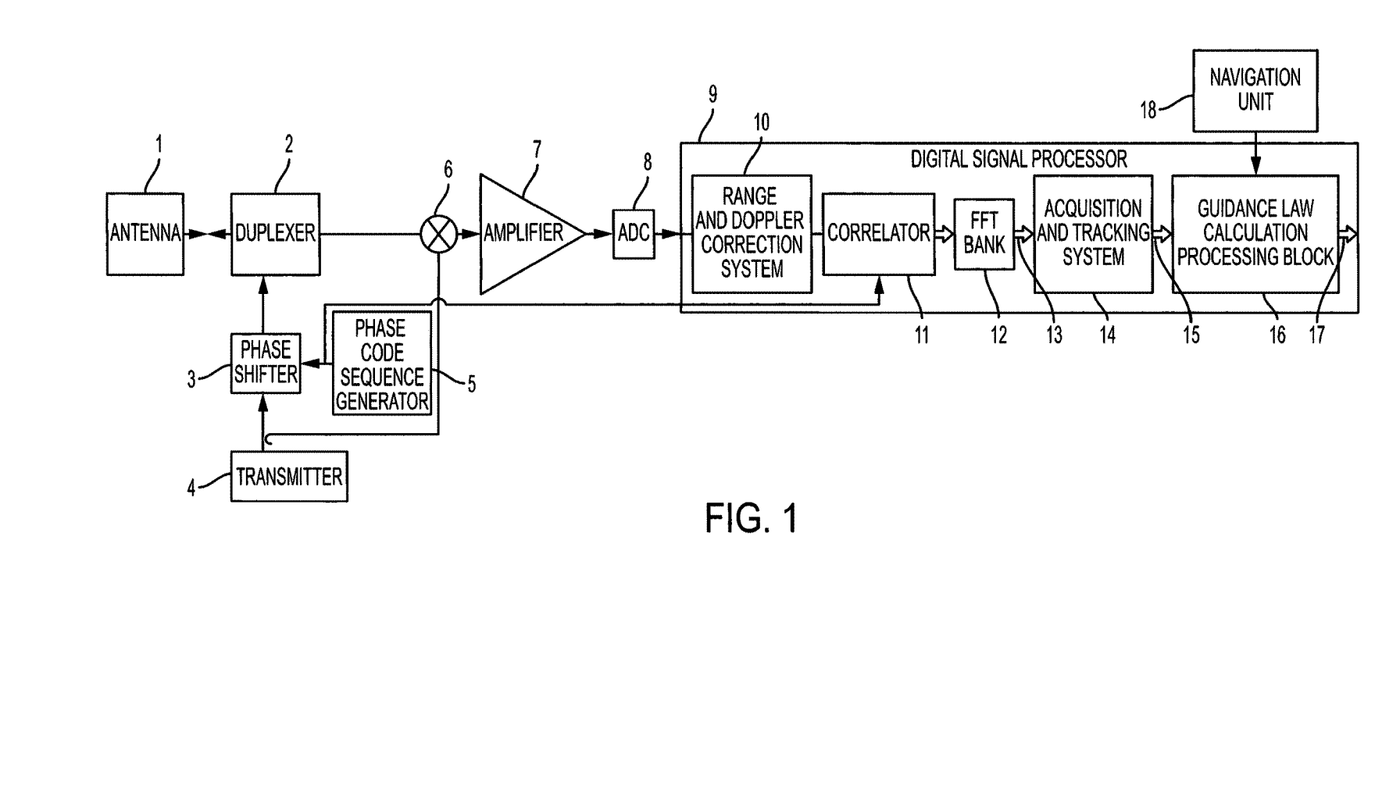
FIG. 1 is a block diagram showing a seeker and guidance system according to an example embodiment of the invention.

A transmitter 4 generates a radio-frequency signal which is passed through the phase shifter 3. The phase-shifter 3 is a binary phase shifter providing either 0 degrees or 180 degrees phase shift according to a control signal from a phase code sequence generator 5. The phase code sequence generator 5 provides a random or a pre-determined binary sequence at high bandwidth, typically several hundred MHz.

The receiver mixer 6 creates a baseband signal by mixing the signal received from the antenna 1 with a component of the signal 4 from the transmitter 4. The created baseband signal is amplified in an amplifier 7 and converted to a digital data stream in an Analogue to Digital Converter (ADC) 8. The ADC 8 is clocked by a clock oscillator (not shown) which is synchronised to the phase code sequence generator 5.

The remainder of the processing is undertaken in a Digital Signal Processor 9. The signal from the ADC 8 is modified by a range and Doppler correction system 10 which implements an autofocus function. The signal is then correlated, in a correlator 11, with the phase code sequence from the phase code sequence generator 5, to separate the received signal into multiple range cells, the cell resolution being determined by the rate of the phase code sequence. Each range cell is processed in FFT bank 12 to resolve the signals into multiple frequency cells. The resulting output 13 is thus a range-Doppler map in which the received signal is segregated into a matrix of range and Doppler (velocity) cells. An acquisition and tracking system 14 processes the range-Doppler map to detect and acquire the target signal, track the appropriate cells containing the target return, and provide a target-tracking signal 15 to a guidance law calculation processing block 16.

In a method of guiding a missile in flight to a target (discussed further below, with reference to FIG. 2), the guidance law calculation processing block 16 determines the location of the target and calculates and provides guidance commands to the missile. A navigation unit 18 provides location data of the missile for use in the calculation.

In a method of guiding a missile in flight to a target (FIG. 2), the location of the missile and the range to the target are measured at a plurality of moments during the flight of the missile (step 100). The location of the target is calculated from the measured ranges and the measured missile locations (step 200). A required velocity vector angle is calculated from the calculated location of the target and a guidance law (step 300). A lateral acceleration required to provide the missile with a velocity oriented to the target at the required velocity vector angle is calculated for the missile (step 400). The missile is caused to accelerate with the calculated lateral acceleration, so that the missile follows a trajectory according to the guidance law (step 500).

Figure 2:
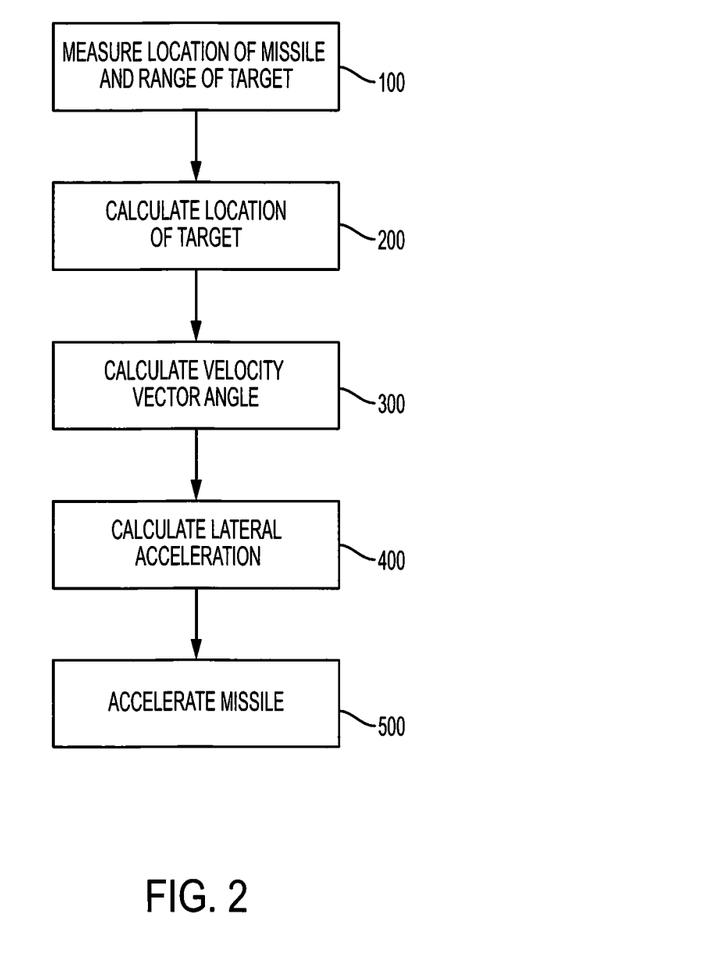
FIG. 2 is flow chart showing the steps of a guidance method, according to an example embodiment of the invention, implemented in the seeker and guidance system of FIG. 1.

The method of FIG. 2, and some of the ideas underlying it, will now be described in more detail. The description is of an example implementation of the method and does not limit the scope of the claimed invention.

Consider a seeker measuring the range, velocity and acceleration of a target, relative to the missile, at a set of n points along the missile trajectory.

The location of the missile is measured by the missile's navigation system (e.g. using a Global Positioning System GPS receiver) relative to the Earth (i.e. in an earth-axis co-ordinate system). Let the missile be at points $(x_1, y_1, z_1)$ to $(x_n, y_n, z_n)$. Let the target be at points $(a_1, b_1, c_1)$ to $(a_n, b_n, c_n)$. Hence, the range to the target when the missile is at point n is:

$$R_n = \sqrt{(x_n - a_n)^2 + (y_n - b_n)^2 + (z_n - c_n)^2}$$

The relative velocity of the missile and the target is:

$$V_n = \dot{R}_n = \frac{(x_n - a_n)(\dot{x}_n - \dot{a}_n) + (y_n - b_n)(\dot{y}_n - \dot{b}_n) + (z_n - c_n)(\dot{z}_n - \dot{c}_n)}{R_n}$$

The relative acceleration of the missile and the target is:

$$A_n = \ddot{R}_n = \frac{(x_n - a_n)(\ddot{x}_n - \ddot{a}_n) + (\dot{x}_n - \dot{a}_n)^2 + (y_n - b_n)(\ddot{y}_n - \ddot{b}_n) + (\dot{y}_n - \dot{b}_n)^2 + (z_n - c_n)(\ddot{z}_n - \ddot{c}_n) + (\dot{z}_n - \dot{c}_n)^2 - V_n^2}{R_n}$$

Assuming, in this example, that the target is moving at a constant velocity $(\dot{a}, \dot{b}, \dot{c}) = (u, v, w)$, so that $$a_n = a_0 + u t_n,$$
$$b_n = b_0 + v t_n,$$
$$c_n = c_0 + w t_n$$

Where $(a_0, b_0, c_0)$ is the initial position of the target. Then:

$$R_n = \sqrt{(x_n - (a_0 + u t_n))^2 + (y_n - (b_0 + v t_n))^2 + (z_n - (c_0 + w t_n))^2}$$

$$V_n = \dot{R}_n = \frac{\left(x_n - (a_0 + u t_n)\right)(\dot{x}_n - u) + \left(y_n - (b_0 + v t_n)\right)(\dot{y}_n - v) + \left(z_n - (c_0 + w t_n)\right)(\dot{z}_n - w)}{R_n}$$

$$A_n = \ddot{R}_n = \frac{\left(x_n - (a_0 + u t_n)\right)\ddot{x}_n + (\dot{x}_n - u)^2 + \left(y_n - (b_0 + v t_n)\right)\ddot{y}_n + (\dot{y}_n - v)^2 + \left(z_n - (c_0 + w t_n)\right)\ddot{z}_n + (\dot{z}_n - w)^2 - V_n^2}{R_n}$$

In those equations, the missile motion parameters ((x,y,z) and its derivatives) are all measured values, known in the missile. The remaining six unknowns, the target initial position ($a_0$, $b_0$, $c_0$) and constant velocity (u, v, w) can in principle be solved if the measurements of the missile motion parameters are made at at least two trajectory points (giving six equations). In practice, measurement will be noisy, and so many trajectory points are used, with the values for $a_0$, $b_0$, $c_0$, u, v, w that give a best fit to the measured data being determined. In this example, an iterative algorithm is used to find a solution to the n equations by seeking values for the six unknown target parameters that minimise an error function. Consider a trial solution ($\hat{a}_0,\hat{b}_0,\hat{c}_0,\hat{u},\hat{v},\hat{w}$), giving solutions ($\hat{R}_n,\hat{V}_n,\hat{A}_n$). A measure of the error of that solution is given by:

$$E = \frac{\Sigma_n(R_n - \hat{R}_n)^2}{\varepsilon_R^2} + \frac{\Sigma_n(V_n - \hat{V}_n)^2}{\varepsilon_V^2} + \frac{\Sigma_n(A_n - \hat{A}_n)^2}{\varepsilon_A^2}$$

The three error terms are weighted separately by $\varepsilon_R$, $\varepsilon_V$, $\varepsilon_A$, according to the contribution of that error to the overall accuracy of the calculation of the target location. An optimisation method (e.g. Generalized Reduced Gradient (GRG2) nonlinear optimization code, as developed by Leon Lasdon, University of Texas at Austin, and Alan Waren, Cleveland State University) is used to search for a minimum value of E by varying the trial solution ($\hat{a}_0,\hat{b}_0,\hat{c}_0,\hat{u},\hat{v},\hat{w}$) to find a best-fit solution ($\hat{a}_f,\hat{b}_f,\hat{c}_f,\hat{u}_f,\hat{v}_f,\hat{w}_f$).

The seeker measurement process has a latency $\tau_l$, principally due to a finite integration time. Consequently, the estimate of the target location is made by extrapolating forward to the present time. So, the current estimated position of the target at time $t_n$ is:

$$(\hat{a}_0,\hat{b}_0,\hat{c}_0) = (\hat{a}+\hat{u}(t_n+\tau_l),\hat{b}+\hat{v}(t_n+\tau_l),\hat{c}+\hat{w}(t_n+\tau_l))$$

The above process is repeated continuously during flight, to produce an updating measurement of the target position and velocity. The measurement is derived directly in Earth axes and is independent of the missile body orientation. The measurement is substantially unaffected by antenna or radome aberration effects.

For the seeker to be able to calculate the target position, a guidance law is used that controls the missile to fly a particular curved trajectory. Selection of the trajectory results from a balancing of the competing demands of, on the one hand, the desire for good resolution and, on the other hand, physical limitations in the operating performance of the missile, including in some cases particular operational requirements. Thus, the missile trajectory is selected to obtain estimates for the target position and velocity that is of an optimal accuracy, taking other constraints into account. In this example, for reasons discussed in more detail below, the missile flies a trajectory consisting principally of two stages. In the first stage, the missile flies in a equiangular spiral trajectory, keeping the sightline from the missile to the estimated target position at a constant, maximal, angle. When the lateral acceleration required to maintain the missile on that equiangular spiral trajectory becomes too large, the second stage begins, in which the trajectory has a lateral acceleration maintained at the maximum lateral acceleration of which the missile is capable.

It is desirable to have a resolution that is sufficient to separate the target from all other objects visible to the missile. In this example, a prior-art technique, Doppler Beam Sharpening alternatively called Synthetic Aperture Radar, is used to achieve that. The technique aims to combine fine range resolution with fine Doppler resolution.

If a target can be isolated in a particular range cell at range R then the target lies on a sphere radius R centred about the seeker. Also, if the target Doppler shift is measured to be $f_d$ then the target lies on a cone of semi-angle $\theta$ with its apex at the seeker and its axis along the missile velocity vector $V_m$, and $$f_d = \frac{2V_m\cos(\theta)}{\lambda}$$

The sphere and the cone intercept each other in a circle of radius $R\sin(\theta)$. For a ground- or sea-based target, the target lies on an approximately flat surface, which intercepts the circle at two points. Thus the location of the target is determined down to those two points, and it is usually immediately apparent which of the two points is the point at which the target is actually to be found.

The implications for choice of trajectory are as follows. Where the missile flight path is at a small angle to the horizontal, the circle intercepts the surface approximately perpendicularly, and hence the seeker's resolution cell encloses a very small area of the surface. For a steep dive angle, on the other hand, the circle is closer to being parallel with the surface, and the resolution cell therefore encloses a much larger area, i.e. the position of the target is determined much less accurately for a steep dive angle than for a substantially horizontal flight.

From the above equation for the target Doppler shift frequency, the width of the resolution cell is:

$$\delta\theta = -\frac{\lambda}{2V_m\sin(\theta)}\delta f_d$$

where $\delta f_d$ is the Doppler resolution. Thus, the cross-track resolution is large when $\theta$ is small, so it is preferable for the relative velocity vector of the missile to be at as large an angle as possible to the sightline between the target and the missile.

So, when the target is in a ground environment that is close to horizontal, the optimal trajectory to achieve good resolution is parallel to the ground and offset away from the sightline as far as possible. That results in the velocity resolution cells being approximately perpendicular to the range resolution cells, and having a minimum width on the ground. For complex conditions, for example in urban areas or mountainous regions, the seeker's circular resolution cell may intercept the ground at several points. Although in that case the considerations affecting optimal trajectory may be more complex, one can nevertheless say that it is desirable for the seeker's trajectory not to be too steep, as a steep trajectory will generally result in the seeker's circular resolution cell encompassing a large area of clutter, with degradation of accuracy.

Various constraints limit the resolution that can be achieved in practice. The seeker will have a limited field of regard (FOR), and, to avoid the seeker losing sight of the target, the missile flies on a trajectory in which the maximum angle of look from the seeker to the target is kept within the FOR. Also, the trajectory must be such that the missile does not impact the ground before reaching the target. Furthermore, for some warhead types, it is necessary for the missile trajectory to have a terminal dive angle that is as steep as possible, so that an "up-and-over" trajectory is then preferred; however, that is in conflict with the condition for a good seeker resolution, and so a compromise may be necessary when selecting the trajectory. Another constraint is that the trajectory curvature should not demand a missile acceleration greater than the actual maximum acceleration capability of the missile.

Taking those considerations into account, the proposed two-stage trajectory starts with an initial phase during which flight is level (assuming a target on a substantially horizontal surface) and the missile velocity is held at an angle $\theta_{max}$ to the sightline, resulting in a trajectory having a constant sightline angle to the target, i.e. an equiangular spiral trajectory. Note that $\theta_{max}$ can be selected to be slightly larger than the maximum FOR because of the missile incidence angle: because the missile is turning towards the target as it flies, the sightline angle relative to the missile body is smaller than the sightline angle relative to the velocity vector. Hence $\theta_{max}$ can be selected to be slightly larger than the FOR.

As the flight proceeds, the lateral acceleration required from the missile for it to maintain its velocity at the angle $\theta_{max}$ to the sightline builds up, until a point is reached where the missile cannot maintain the necessary acceleration. At this point, the guidance law enters its second stage, at which the lateral acceleration of the missile is held close to its maximum value until the moment of impact with the target. Such a trajectory has approximately constant curvature (i.e the trajectory is an arc of a circle) if the missile velocity is constant. It can be shown that a seeker using Doppler beam sharpening (Synthetic Aperture Radar—SAR) and flying on a constant-curvature trajectory has cross-track resolution on the target that is constant and independent of range to go.

The transition from the first stage to the second stage of the trajectory is made when it is calculated that the maximum lateral acceleration a is required for the remainder of flight in order to intercept the target. That is when the range $R_t$ from the missile to the projected impact point is:

$$R_t = \frac{2V_m^2 \sin(\theta_{max})}{a}$$

The projected impact point is $(a_n+ut_g, b_n+vt_g, c_n+wt_g)$, where $t_g$ is the estimated time to impact. Thus, in summary, according to this guidance law, the desired angle between the missile velocity vector and the sightline to the target is:

$$\theta = \theta_{max} \text{ for } R_t < \frac{2V_m^2 \sin(\theta_{max})}{a}$$

$$\theta = \sin^{-1}\left(\frac{R_t a}{2V_m^2}\right) \text{ for } R_t > \frac{2V_m^2 \sin(\theta_{max})}{a}$$

The velocity vector required to implement the chosen $\theta$ is, in this example, calculated as follows. Let the missile-to-target sightline unit vector be $(s_x, s_y, s_z)$. To simplify the calculation, we rotate the x, y, z axes to a new co-ordinate system, having axes x', y', z', in which the y' component $s'_y$ is zero, i.e.

$$(s'_x, s'_y, s'_z) = (s_x \cos\alpha - s_y \sin\alpha, s_x \sin\alpha + s_y \cos\alpha, s_z)$$

and $$\tan\alpha = -\frac{s_y}{s_x}$$

so that $s'_y=0$ (and the sightline therefore lies in the (x',y') plane). We now calculate a vector $(v'_x, v'_y, v'_z)$ which is at the desired angle $\theta$ to the sightline, according to the trajectory calculation above, and lies at an angle $\varphi$ to the vertical in the (y',z') plane. The angle $\varphi$ of the plane of the velocity vector is selected as a compromise between obtaining optimum seeker resolution (i.e. trajectory in the horizontal plane) and optimum terminal dive angle (i.e. trajectory in the vertical plane). The desired vector satisfies:

$$\cos\theta = v'_x s'_x + v'_y s'_y + v'_z s'_z$$

and $$v'_y = v'_z \tan\varphi$$

Therefore, we have $$(v'_x, v'_y, v'_z) = K \cdot \left(\frac{\cos\theta - v'_z s'_y \tan\varphi - v'_z s'_z}{s'_x}, v'_z \tan\varphi, v'_z\right)$$

where K is a scale factor providing the required speed $V_m$:

$$K = \frac{V_m}{\sqrt{\left(\frac{\cos\theta - v'_z s'_y \tan\varphi - v'_z s'_z}{s'_x}\right)^2 - (v'_z \tan\varphi)^2 - (v'_z)^2}}$$

Rotating back to the original axis system, to give the required missile velocity vector, we have:

$$(v_x, v_y, v_z) = (v'_x \cos\alpha + v'_y \sin\alpha, -v'_x \sin\alpha + v'_y \cos\alpha, v'_z)$$

The required missile acceleration $A_m$ is selected to be proportional to the required change in missile velocity vector:

$$A_m = P(v_x - u, v_y - v, v_z - w)$$

where P is a value selected according to the dynamics of the missile and autopilot.

In summary, the processing sequence in this example implementation is as follows:
1 Take input measurements:
   a. Missile inertial measurements from the missile's inertial measurement unit: $x_m, y_m, z_m, \dot{x}_m, \dot{y}_m, \dot{z}_m, \ddot{x}_m, \ddot{y}_m, \ddot{z}_m$
   b. Target sightline measurements from the seeker: R, V, A.
2 Calculate target location and velocity: a, b, c, u, v, w.
3 Calculate sightline vector $(s_x, s_y, s_z) = (a-x, b-y, c-z)$.
4 Calculate required velocity vector angle $\theta$ from the guidance law.
5 Calculate desired missile velocity vector $(v_x, v_y, v_z)$.
6 Calculate required missile lateral acceleration $A_m$.
7 Repeat from step 1.

The basic requirements for a seeker able to implement the above example algorithm are:
Good range resolution and precise range measurement accuracy;
Capability to achieve SAR processing to resolve the target from other targets and clutter; and
Accurate Doppler measurement accuracy.
There are no requirements for angle tracking except the need to ensure the target remains within the antenna beamwidth.

In a simple seeker implementation such as that shown in FIG. 1, a broad beam antenna is used whose beamwidth encompasses all the required sightline angles. For example, the broad-beam antenna could be a conformal array (i.e. an antenna integrated into and conformal with the radome), which has many advantages, particularly in a small seeker, for example:

Maximum use of available aperture—the antenna aperture is equal to the missile diameter for zero look angle and the aperture increases with increasing angle of look as the projected area increases.

Space within the radome is available for use. In small anti-surface missiles this is the ideal position to place the warhead.

No need for accurate beam pointing.

High transmitter power can be achieved by multiple low-power modules, each feeding a separate element of the array and using free space power combining to achieve the full power level.

If high range resolution is required, a broad bandwidth signal is used. That may be achieved for example through very high rate binary phase coding.

Whilst the present invention has been described and illustrated with reference to particular embodiments, it will be appreciated by those of ordinary skill in the art that the invention lends itself to many different variations not specifically illustrated herein.

Although the simplest method for measuring target acceleration is to measure closing velocity in progressive time steps and calculate the rate of change of velocity, more sophisticated techniques are available, for example techniques relating to autofocusing.

To create a focused SAR image, the target return is held in a fixed range-Doppler cell throughout the integration period, typically 100 to 500 ms. During that time the missile can fly over 100 m—orders of magnitude more than the resolution we are trying to achieve. Therefore, a progressive time shift and frequency shift is applied to the target return so that it remains at a stationary range and Doppler before the SAR fast Fourier transform (FFT) processing is applied. Once the Doppler shift of the target is measured, the rate of range walk is easily calculated and if the closing velocity can be assumed to be constant good focusing quality can be achieved. However, because the Doppler shift of the signal returns vary over the beamwidth of the target a single value of range walk cannot create a focused image over the whole of the beamwidth. Various autofocusing techniques are known in the prior art to overcome that problem.

One technique that can be applied is to assume that the rate of change of Doppler shift is constant over the integration period. The samples from the target return are processed multiple times in parallel, each with a different Doppler walk associated with a different rate of change of Doppler shift. That results in a set of multiple-range Doppler maps of the target scene. An algorithm is applied which measures the apparent contrast of the scene—effectively looking for a high spatial frequency. If a graph of contrast versus Doppler rate is plotted, the point with maximum contrast can be found and hence the sightline acceleration rate can be deduced.

In applications in which a broadbeam antenna does not have sufficient gain to achieve target acquisition at a desired range, a simple beam-steering system can be incorporated. That may be, for example, a switchable beam, which can be positioned at a small number of preset angles selected according to the calculated target angle. (That would also have the advantage of eliminating mechanically the spurious extra target location resulting from the SAR processing.)

In some applications, the tracking algorithms described above may not provide adequate accuracy to achieve a required terminal accuracy. In such cases, the missile may also incorporate an electro-optic (IIR) detector in the nose of the missile. The radar can be used to provide long-range, all-weather performance and the IR sensor can be used to take over guidance at short range in the terminal phase. Provided the maximum target speed is not too high, the IR sensor will only need a small Field of Regard and could therefore be un-gimballed.

Another possibility is to use the seeker tracking algorithm described above in a monopulse radar. Although using a monopulse configuration would add significantly to the complexity of the seeker, requiring multiple receiver channels and greatly increased antenna pointing accuracy, the target location method could be used to provide in-flight calibration of the antenna system. That could overcome one of the main difficulties foreseen with a non-gimballed antenna array, namely the difficulty in achieving accurate pointing accuracy, particularly in the severe and variable thermal environment suffered in the nose of a missile.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may be absent in other embodiments.

The invention claimed is:

1. A method for a seeker, in a missile in flight, to locate a moving target, the method comprising:
   (a) measuring, at a plurality of moments during the flight of the missile, the location of the missile and the range to the moving target;
   (b) calculating the location of the moving target from the measured ranges and the measured missile locations; and
   (c) measuring Doppler information to determine a closing velocity of the missile relative to the moving target and using the Doppler information, in synthetic aperture radar processing, to separate the moving target from clutter in the calculation of the location of the moving target and in calculation of a velocity of the moving target.

2. The method of claim 1, including the step of measuring Doppler rate information to determine a closing acceleration of the missile relative to the moving target and using the Doppler rate information in the calculations of the location of the moving target and of the velocity of the moving target.

3. The method of claim 1, wherein calculated location of the moving target is used to calibrate a measurement of an angular location of the moving target relative to the seeker.

4. The method of claim 1, in which the missile has a trajectory having a first stage and a second stage, the second stage comprising a constant lateral acceleration trajectory, the method being used at least in the second stage.

5. The method of claim 4 in which the constant lateral acceleration trajectory has a lateral acceleration maintained at or close to the maximum lateral acceleration of which the missile is capable.

6. A radar seeker comprising:
   a digital signal processor configured to perform synthetic aperture radar processing, to locate a moving target, by:

(a) measuring, at a plurality of moments during the flight of the missile, the location of the missile and the from the missile to the moving target;
(b) calculating the location of the moving target from the measured ranges and the measured missile locations; and
(c) utilizing Doppler processing to create a Synthetic Aperture Radar Image to provide additional resolution to separate the moving target from other targets and clutter in the vicinity of the moving target and to calculate a velocity of the moving target.

7. A radar seeker as claimed in claim 6, configured to utilise an autofocus system to correct for motion of the moving target relative to the seeker during an integration period of the radar, to provide a measurement of a relative acceleration of the moving target with respect to the missile.

8. A radar seeker as claimed in claim 6, wherein the seeker includes an angle-tracking system to determine the angle of the missile-target sightline with respect to the missile axis and wherein the location and velocity of the moving target is used to calibrate the angle tracking system in order to remove or reduce angle measurement errors.

9. A radar seeker as claimed in claim 6, including an antenna in the form of a conformal array configured to allow space in front of the seeker for a warhead or additional moving target sensor.

10. A radar seeker as claimed in claim 6, configured to follow a trajectory having first and second stages, the second stage comprising a trajectory selected to maintain a lateral acceleration that is at or close to the maximum that can be achieved by the missile and the seeker being configured to utilise said Doppler processing in the second stage.

11. A missile comprising:
a navigation system; and
a digital signal processor configured to perform synthetic aperture radar processing, the digital signal processor being configured to:
(a) measure, at a plurality of moments during the flight of the missile, the location of the missile and the range to a moving target;
(b) calculate the location of the moving target from the measured ranges and the measured missile locations;
(c) calculate a required velocity vector angle from the calculated location of the moving target and a guidance law;
(d) calculate for the missile a lateral acceleration required to provide the missile with a velocity oriented to intercept the moving target at the required velocity vector angle;
(e) supply the calculated lateral acceleration to another part of the missile that is configured to cause the missile to accelerate; and
(f) utilize Doppler processing to create a synthetic Aperture Radar Image to provide additional resolution to separate the moving target from other targets and clutter in the vicinity of the moving target and to calculate a velocity of the moving target.

12. A missile as claimed in claim 11, the missile being configured to (i) measure Doppler information to determine a closing velocity of the missile relative to the moving target and to use the Doppler information in the calculation of the location of the moving target and in the calculation of a velocity of the moving target and/or (ii) to measure Doppler rate information to determine a closing acceleration of the missile relative to the moving target and to use the Doppler rate information in the calculation of the location of the moving target and in the calculation of a velocity of the moving target.

13. A missile as claimed in claim 11, wherein the guidance law is such that, in operation, the missile is caused to fly, in a first stage, a trajectory selected to give an equiangular spiral around the moving target.

14. A missile as claimed in claim 13, wherein the guidance law is such that, in operation, the missile is caused to fly the equiangular spiral at a maximum angle of the field of regard of the seeker antenna.

15. A missile as claimed in claim 13, wherein the guidance law is such that, in operation, the missile is caused to fly, in a second stage, a trajectory selected to maintain a lateral acceleration that is the maximum that can be achieved by the missile.

16. A missile as claimed in claim 15, wherein the guidance law is such that, in operation, the missile is caused to fly the equiangular spiral at a maximum angle of the field of regard of the seeker antenna, and wherein the guidance law is such that, in operation, the second stage commences when the acceleration required to maintain the missile on the equiangular spiral becomes too large.

17. A missile as claimed in claim 11 that is too small to accommodate a seeker with a steerable antenna.

* * * * *